United States Patent
Pachouri et al.

(10) Patent No.: US 10,218,707 B2
(45) Date of Patent: Feb. 26, 2019

(54) CONTROLLING ACCESS TO COMPUTER ACCOUNTS MANAGED BY A COMPUTER ACCOUNT SERVER TO PROVIDE HANDOFF TO A NOMINEE COMPUTER TERMINAL

(71) Applicant: CA, Inc., New York, NY (US)

(72) Inventors: Rajendra Kumar Pachouri, Bangalore (IN); Chinmay Namjoshi, Bangalore (IN); Lal Mohan Kumar, Bangalore (IN); Hitesh Jain, Bangalore (IN)

(73) Assignee: CA, Inc., New York, NY (US)

( * ) Notice: Subject to any disclaimer, the term of this patent is extended or adjusted under 35 U.S.C. 154(b) by 287 days.

(21) Appl. No.: 15/279,041

(22) Filed: Sep. 28, 2016

(65) Prior Publication Data
US 2018/0091521 A1    Mar. 29, 2018

(51) Int. Cl.
*G06F 21/00* (2013.01)
*H04L 29/06* (2006.01)
*G06F 21/45* (2013.01)

(52) U.S. Cl.
CPC ........... *H04L 63/102* (2013.01); *G06F 21/45* (2013.01); *H04L 63/0884* (2013.01); *H04L 63/108* (2013.01); *H04L 63/123* (2013.01); *G06F 2221/2137* (2013.01)

(58) Field of Classification Search
CPC ... H04L 63/102; H04L 63/108; H04L 63/123; G06F 21/6218
See application file for complete search history.

(56) References Cited

U.S. PATENT DOCUMENTS

| | | | |
|---|---|---|---|
| 2010/0146611 A1* | 6/2010 | Kuzin | G06F 21/41 726/8 |
| 2017/0353456 A1* | 12/2017 | Coronel | G06Q 50/10 |
| 2018/0034824 A1* | 2/2018 | Maycotte | G06F 17/30339 |

* cited by examiner

Primary Examiner — Kendall Dolly
(74) Attorney, Agent, or Firm — Sage Patent Group (57) ABSTRACT

A computer account server receives a nominee identity from an account owner associated with owner access credentials. The nominee identity is stored in a data structure of a computer account that is selected based on the owner access credentials. Electronic access to information stored in the data structure is then restricted to access requests from computer terminals that provide the owner access credentials. In response to determining that an account handoff event has become satisfied for the computer account, the computer account server sends a nominee handoff message using the nominee identity retrieved from the data structure. A nominee access request message is received from a nominee computer terminal. In response to validating content of the nominee access request message, the computer account server modifies the restriction of electronic access to grant the nominee computer terminal electronic access to the information stored in the data structure of the computer account.

8 Claims, 8 Drawing Sheets

CONTROLLING ACCESS TO COMPUTER ACCOUNTS MANAGED BY A COMPUTER ACCOUNT SERVER TO PROVIDE HANDOFF TO A NOMINEE COMPUTER TERMINAL

BACKGROUND

The present disclosure relates to computer account servers and, in particular, to controlling access by computer terminals to data structures of computer accounts that are managed by computer account servers.

The volume of digital data that is stored for users on local and cloud-based servers is growing at exponential rates. Moreover, there is a rapid proliferation in the number of accounts that users now own for email, social media, video/picture authoring, video/music/application downloading, etc. For example, some users own (control) multiple work email accounts and multiple personal email accounts. It is important for account service providers to be able to manage such accounts to minimize and ensure effective use of the server storage requirements of these accounts. Some email account service providers are known to purge (delete) user accounts due to inactivity. However, these solutions are risky because the inactivity time period may be unreasonable to some users, and purging a user's account can result in the irretrievable loss of digital data that is highly valuable to more than just the account owner.

SUMMARY

Some embodiments of the present disclosure are directed to a method performed by a processor of a computer account server. A nominee identity is received from an account owner associated with owner access credentials. The nominee identity is stored in a data structure of a computer account that is selected based on the owner access credentials from among a plurality of computer accounts managed by the computer account server. Electronic access to information stored in the data structure of the computer account, is restricted to access requests from computer terminals that provide the owner access credentials. In response to determining that an account handoff event has become satisfied for the computer account, a nominee handoff message is sent using the nominee identity retrieved from the data structure of the computer account. A nominee access request message is received, responsive to the nominee handoff message, from a nominee computer terminal contacted through the nominee handoff message. In response to validating content of the nominee access request message, the restricting of electronic access is modified to grant the nominee computer terminal electronic access to the information stored in the data structure of the computer account.

Some related other embodiments are directed to a computer program product that includes a non-transitory computer readable storage medium storing computer readable program code which when executed by a processor of a computer account server causes the processor to perform operations include receiving a nominee identity from an account owner associated with owner access credentials, and storing the nominee identity in a data structure of a computer account that is selected based on the owner access credentials from among a plurality of computer accounts managed by the computer account server. The operations include restricting electronic access to information stored in the data structure of the computer account, to access requests from computer terminals that provide the owner access credentials. In response to determining that an account handoff event has become satisfied for the computer account, the operations send a nominee handoff message using the nominee identity retrieved from the data structure of the computer account, and receive a nominee access request message from a nominee computer terminal contacted through the nominee network address. In response to validating content of the nominee access request message, the operations modify the restricting of electronic access to grant the nominee computer terminal electronic access to the information stored in the data structure of the computer account.

Other methods, computer program products, and/or computer account servers according to embodiments of the inventive subject matter will be or become apparent to one with skill in the art upon review of the following drawings and detailed description. It is intended that all such additional methods, computer program products, and/or computer account servers be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments of the present disclosure are directed to operations performed by a computer account server to handoff access privileges for a computer account from an account owner to an account nominee in response to an account handoff event becoming satisfied. The account owner can identify the account nominee during an account registration process.

Figure 1:
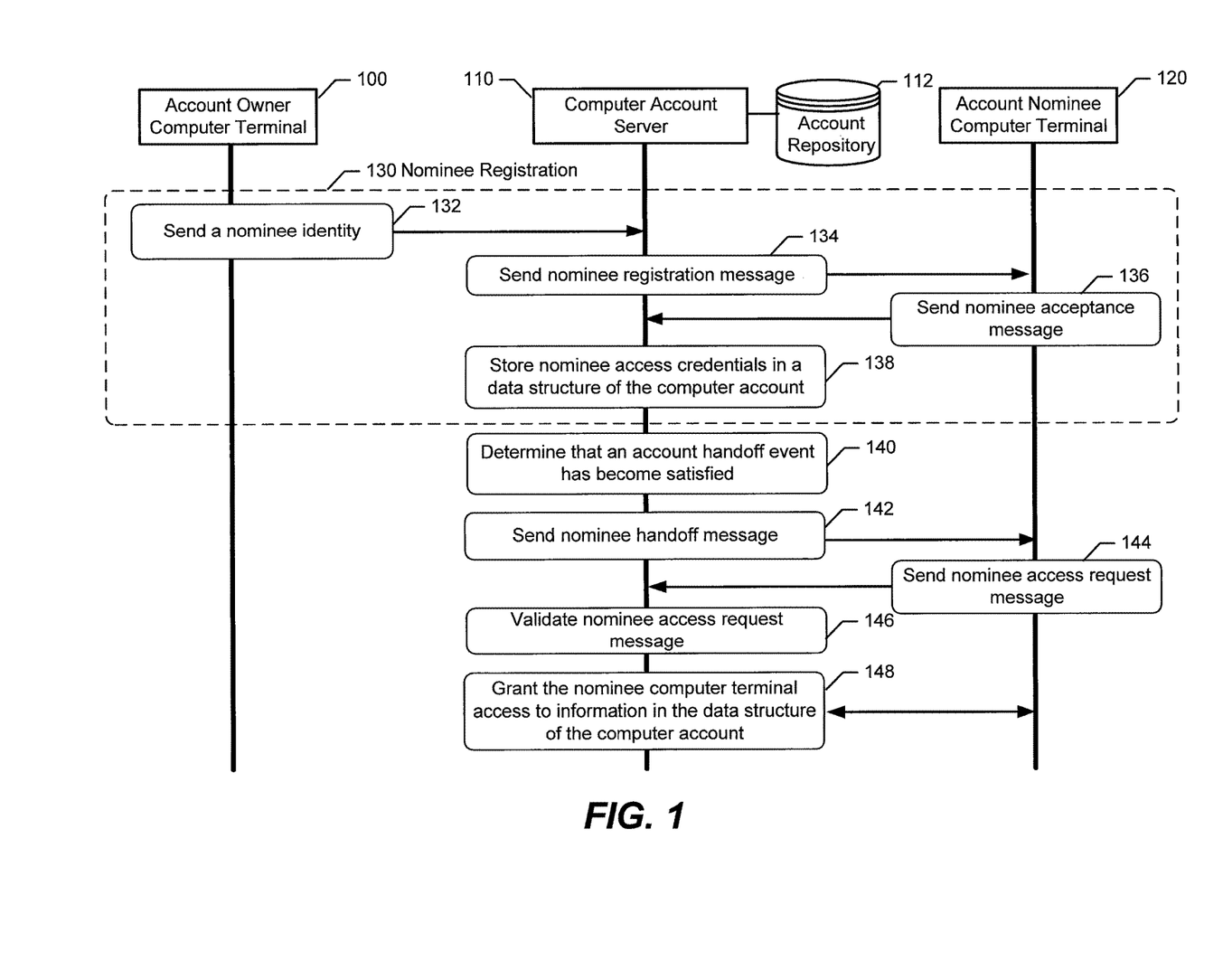
FIG. 1 is a combined flowchart and data flow diagram of operations performed by an account owner computer terminal, a computer account server, and an account nominee computer terminal in accordance with some embodiments of the present disclosure.

These and other related embodiments are described in further detail with regard to the combined flowchart and data flow diagram of FIG. 1. Referring to FIG. 1, a computer system includes an account owner computer terminal 100, a computer account server 110, and an account nominee computer terminal 120. The computer account server 110 manages access to data structures of computer accounts that reside in an account repository 112, e.g., mass data storage nonvolatile memory devices. More particularly, the computer account server 110 can restrict access to the data structure of the computer account to only the account owner who has provided proper account owner credentials. However, in accordance with various embodiments herein the computer account server 110 can also selectively allow an account nominee to have access privileges to the data structure of the computer account.

An example process by which an account owner can designate and register an account nominee is shown by the flowchart and data flows referenced as 130 in FIG. 1. An account owner, who is associated with owner access credentials (e.g., user identifier and password), sends (block 132) a nominee identity to the computer account server 110. The account owner may send the nominee identity during an account registration process or at another time during the existence of a computer account. The computer account server 110 receives the nominee identity and knows the owner access credentials (e.g., from an earlier account login process), determines a network address for the account nominee computer terminal 120 based on the nominee identity, and sends a nominee registration message 134 that is addressed to the network address and contains nominee access credentials determined based on the nominee identity. The account nominee computer terminal 120 can display a notification to an account nominee of the nomination request and request acceptance of the account nomination. Responsive to the account nominee accepting the request, the account nominee computer terminal 120 sends (block 136) a nominee acceptance message to the computer account server 110. The computer account server 110 responsively stores (block 138) the nominee identity in a data structure of a computer account that is selected based on the owner access credentials from among a plurality of computer accounts, e.g., stored in the account repository 112, which are managed by the computer account server. The operation for storing (block 138) nominee identity in the data structure of the computer account, can include storing credential information defined based on the nominee access credentials into the data structure of the computer account. The nominee access credentials may include, without limitation, a user identifier and/or a password.

The computer account server 110 restricts electronic access to information stored in the data structure of the computer account, to access requests from computer terminals that provide the owner access credentials. Thus, in one embodiment the computer account server 110 only allows the account owner who has entered the owner access credentials to have access to information stored in the data structure of the computer account, until an account handoff event become satisfied as explained below.

Responsive to determining (block 140) that an account handoff event has become satisfied for the computer account, the computer account server 110 sends (block 142) a nominee handoff message using the nominee identity retrieved from the data structure of the computer account. The account nominee computer terminal 120 receives a nominee handoff message and may display a handoff notification to the account nominee, which may inform the account nominee that the account nominee needs to take defined actions to manage the computer account.

By way of a nonlimiting example, the computer account server 110 may determine that after a defined inactivity period with the computer account, e.g., during which the account owner has not logged in or otherwise accessed the data structure of the computer account during the inactivity period, that the account handoff event has become satisfied. The computer account server 110 may then send a message to the account nominee computer terminal 120 informing the account nominee that the computer account will be purged (deleted) if the account nominee does not take defined actions, e.g., login to the computer account and review or update account details, within a defined time period of such notification.

The computer account server 110 receives the nominee access request message from the nominee computer terminal 120, and responsively validates (block 146) content of the nominee access request message. The operation for validating content of the nominee access request message can be based on the nominee access request message containing credentials that correspond to the credential information stored in the data structure of the computer account.

Proper completion of the validation causes the computer account server 110 to modify its restriction of electronic access to grant (block 148) the nominee computer terminal 120 electronic access to the information stored in the data structure of the computer account. The computer account server 110 may continue to allow the account owner computer terminal 100 co-access privileges to the computer account or may terminate those privileges responsive to granting the nominee computer terminal 120 access privileges to the computer account.

In accordance with some further embodiments, the account owner may define a validity time period during which the account nominee retains the right to request access to the account. The account nominee's rights will expire if the account handoff event does not occur before expiration of the validity time period. Alternatively or additionally, the account nominee's rights may operate to expire if the account handoff event does occur before expiration of the validity time period, but the account nominee waits until after expiration of the validity time period to send (block 144) the nominee access request message to the computer account server 110. In one such embodiment, the computer account server 110 receives a validity time period during which the nominee identity remains valid, and selectively performs the sending (block 142) of the nominee handoff message using the nominee identity retrieved from the data structure of the computer account, only if the account handoff event is determined to have become satisfied for the computer account before expiration of the validity time period.

Some other embodiments are directed to providing increasing security in the nomination process by distributing fragments of the security key to different computer terminals. The security key is required as part of the process for performing handoff of account access to an account nominee. In one embodiment, the computer account server 110 receives a set of nominee identities which includes the nominee identity of the account nominee. The computer account server 110 obtains security key fragments. The security key fragments may be generated by splitting a security key, which is provided by the account owner as part of the nominee identity information (block 132). The security key fragments are then distributed so that different ones of the security key fragments are sent to different computer terminals identified by associated ones of the nominee identities in the set, where one of the computer terminals including the nominee computer terminal. The security key may be split into security key fragments using a "n-of-m" secret sharing algorithm, which splits the security key into m different key fragments, which enables a security key regenerator of the computer account server 110 to reconstruct the security key from a fewer number n (e.g., n=m−1) of the key fragments received from the computer terminals. For example, using a 4-of-5 secret sharing algorithm, a security key is divided into 5 different key fragments that are distributed to 5 different computer terminals for storage. The security key regenerator of the computer account server 110 can reconstruct the original security key so long as at least 4 of the key fragments are received back from those computer terminals.

Responsive to the computer account server 110 determining (block 140) that the account handoff event has become satisfied for the computer account, the computer account server 110 sends nominee handoff messages to the computer terminals, including to the account nominee computer terminal 120. The computer account server 110 then, as part of the process to receive the nominee access request message, receives the security key fragments from the computer terminals identified by the nominee identities in the set responsive to the nominee handoff messages, and receives the nominee access request message from the nominee computer terminal 120. The computer account server 110 then performs the validation (block 146) of content of the nominee access request message from the nominee computer terminal 120, based on generating a reconstructed security key based on the key fragments received from the computer terminals and validating the reconstructed security key. Only if the reconstructed security key satisfies requirements for validation does the computer account server 110 grant (block 148) the nominee computer terminal 120 access to the information in the data structure of the computer account.

Some further embodiments are directed to handling a situation when a nominee does not satisfy a defined requirement, such as because the nominee's age is less than a defined threshold age. These embodiments are now explained in the context of the flowchart of FIG. 2 performed by the computer account server 110 to set up a primary account holder, a guardian account holder, and a co-nominee account holder. The computer account server 110 responds to a nominee registration request (block 200) from a primary account holder, by determining (block 202) whether an account nominee has already been declared for the computer account of the primary account holder. If not, the primary account holder is sent (block 204) a prompt requesting the primary account holder to declare the identity of the nominee, e.g., nominee contact details and credentials, in order to proceed with registration.

Figure 2:
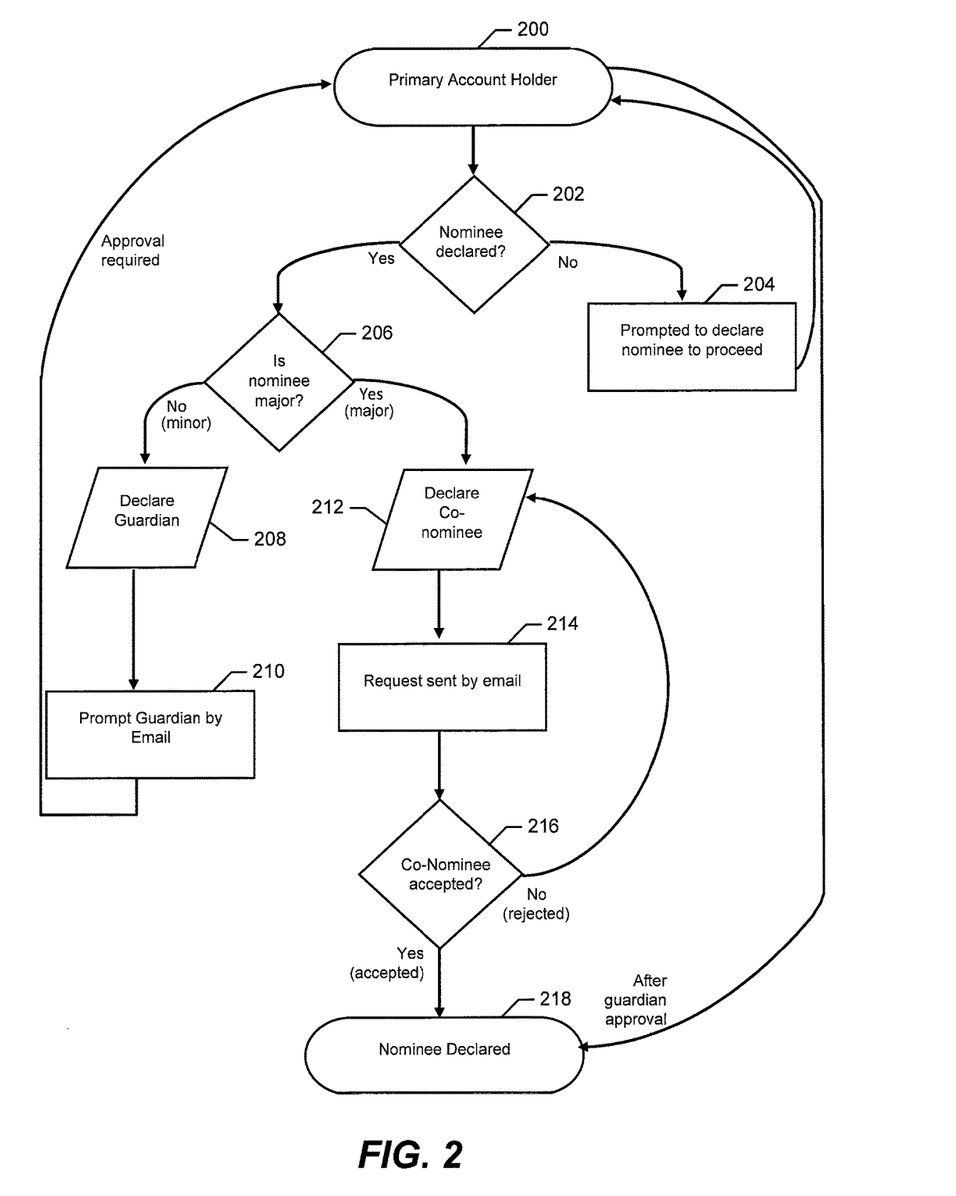
FIGS. 2 and 3 are flowcharts of operations that may be performed by a computer account server in accordance with some embodiments.

When an account nominee is determined (block 202) to have been declared, the computer account server 110 determines whether the nominee satisfies a requirement for being a major account owner, e.g., based on an age of the nominee. Responsive to the nominee not satisfying the requirement, e.g., the nominee is below a threshold age, the computer account server 110 requires the primary account holder 200 to declare (block 208), e.g., providing information identifying, a guardian for the nominee. The computer account server 110 then sends (block 210), e.g., by email, a prompt to the guardian requesting approval of the guardian being designated for purposes of controlling access to the computer account and, if the guardian approves, establishes the guardian as having rights to control whether the nominee can access the computer account if the account handoff event become satisfied.

In contrast, responsive to the nominee satisfying the requirement (block 206), the computer account server 110 declares (block 212) the nominee as a co-nominee, and sends (block 214), e.g., by email, a request to the co-nominee requesting acceptance of the nomination for responsibility to access the computer account if the account handoff event occurs. When the co-nominee is determined (block 216) to have accepted the request, the computer account server 110 declares (block 218) the co-nominee as a nominee who will be contacted, e.g., by a nominee handoff message, if the account handoff event becomes satisfied (block 140). However, if the nominee was determined (block 206) to not satisfy the requirement, the computer account server 110 does not declare (block 218) the co-nominee as a nominee unless if the guardian provides approval responsive to the prompt (block 210).

Some further embodiments are directed to the primary account holder establishing a validity time. During which the nominee is allowed to exercise the privilege of accessing the computer account. These embodiments are now explained in the context of the flowchart of FIG. 3 performed by the computer account server 110.

Figure 3:
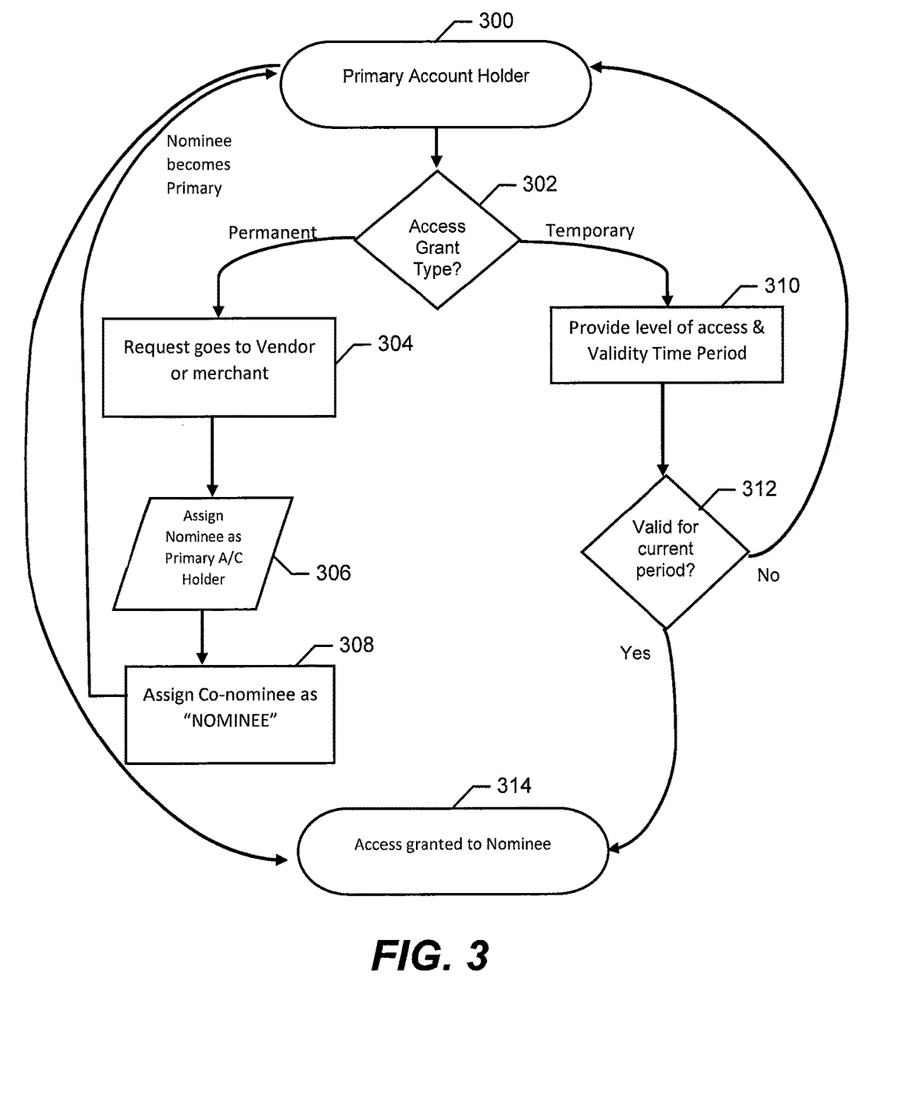

The computer account server 110 responds to a primary account holder instruction (block 300) to establish an account nominee for a computer account, by determining (block 302) whether the access grant is defined by the primary account holder as being permanent or temporary. When defined as temporary, the computer account server 110 receives (block 310) a level of access privileges and a validity time period that is provided by the primary account holder. If the account handoff event is determined (block 312) to become satisfied while the validity time period remains valid, the computer account server 110 grants (block 314) the nominee access privileges to the computer account.

In contrast, when the account nominee is defined to have permanent access privileges, the computer account server 110 may send (block 304) a request to a vendor, merchant, or other service provider for the computer account requesting permission to grant the account nominee as having access privileges to the computer account, and responsive to permission being granted the computer account server 110 assigns (block 306) the nominee as having access privileges to the computer account, and may assign the account nominee as a primary account holder. The computer account server 110 may notify (block 308) the primary account holder that the nominee has been set up with access privileges contingent upon the account handoff event becoming satisfied. The access privileges then remain vested irrespective of how much time has elapsed since they were granted.

Figure 4:
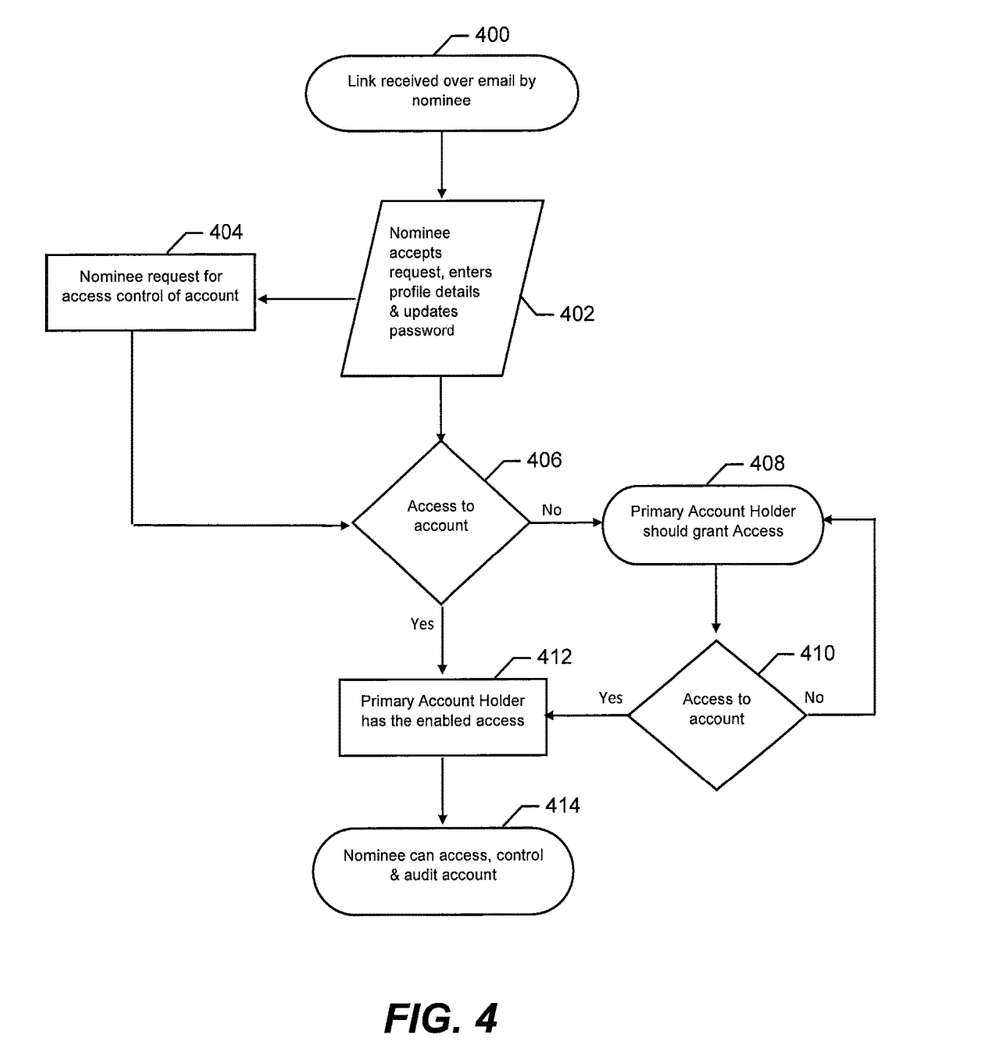
FIG. 4 is a flowchart of operations that may be performed by an account nominee computer terminal in accordance with some embodiment.

Various operations that can be performed by the account nominee computer terminal 120 are shown in the flowchart of FIG. 4. Referring to FIG. 4, the account nominee computer terminal 120 receives (block 400) a nominee registration message by email which contains a user selectable link. The nominee operates the computer terminal 120 to input (block 402) acceptance of the nomination and input credentials, e.g., nominee profile details and password. The nominee computer terminal 120 sends (block 404) a nominee acceptance message containing the nominee credentials to the computer account server 110. The nominee computer terminal 120 monitors (block 406) whether an account handoff event has become satisfied, e.g., indicated by receipt of the nominee handoff message. In response to the handoff event the indicated, the nominee computer terminal 120 initiates operations (block 412) to enable the account nominee to access the computer account (block 412), and communicates with the computer account server 110 to perform operations (block 414) to access the data structure of the computer account, control privileges and actions associated with the computer account, and audit any changes to the data structure of the computer account.

In some further embodiments, the account owner may authorize the account nominee to access the computer account without waiting for the account handoff event to become satisfied. The nominee computer terminal 120 can receive (block 408) an access grant from the account owner computer terminal 100, via the computer account server 110, and respond to the determination (block 410) of the access grant by enabling the account nominee to access the computer account (block 412).

Figure 5:
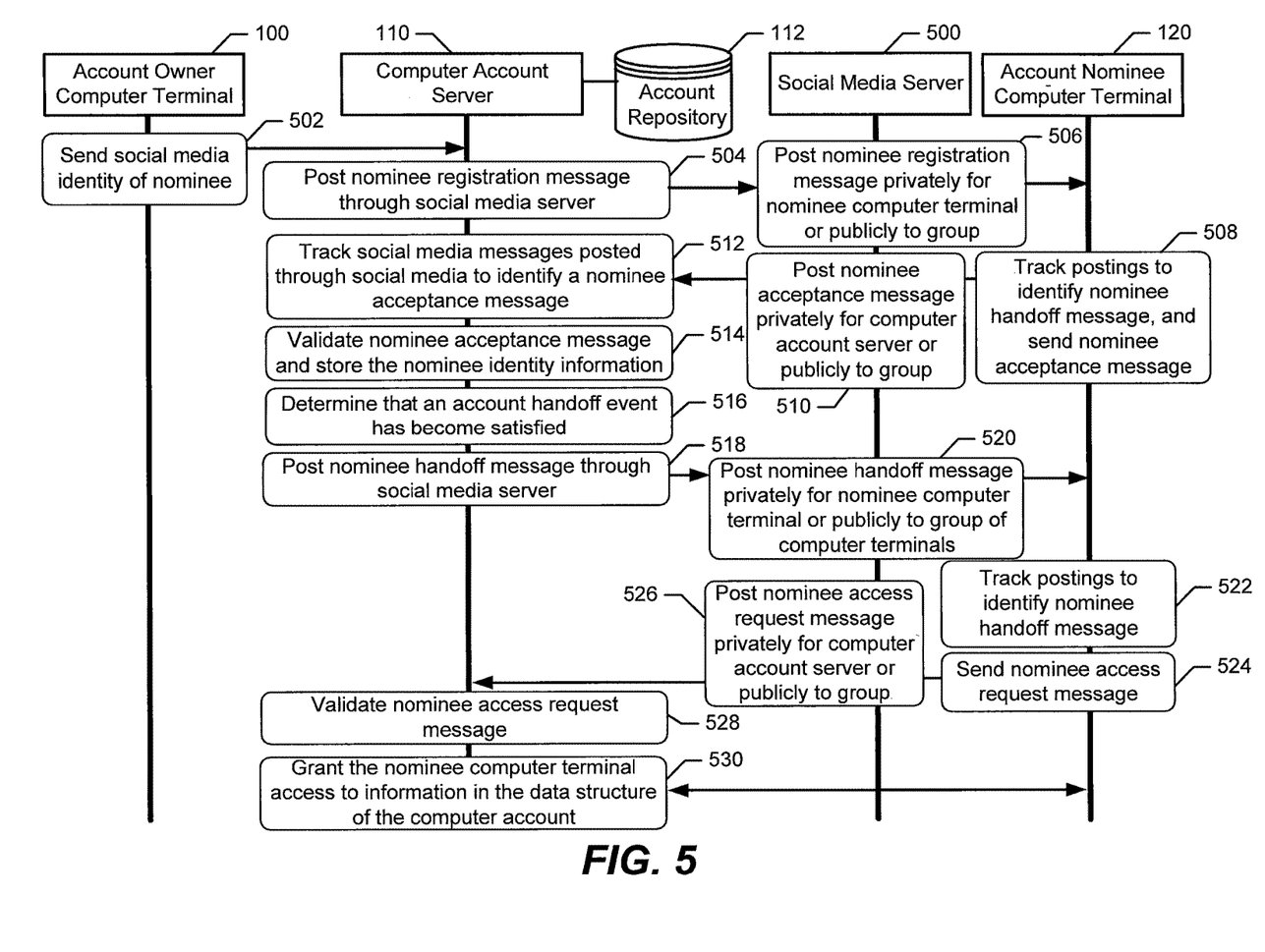
FIG. 5 is a combined flowchart and data flow diagram of operations performed by an account owner computer terminal, a computer account server, a social media server, and an account nominee computer terminal in accordance with some alternative embodiments.

Some other embodiments are directed to the computer account server 110 communicating with the account nominee computer terminal 120 through a social media server 500. The account owner computer terminal can provide social media identity information for a nominee, to the computer account server 110. The computer account server 110 can then electronically post messages through an application programming interface with the social media server 500 to perform the process for notifying the account nominee of the nomination and to the subsequent occurrence of the account handoff event which necessitates an action by the account nominee. FIG. 5 is a combined flowchart and data flow diagram of operations performed by the account owner computer terminal 100, the computer account server 110, the social media server 500, and the account nominee computer terminal 120 in accordance with some alternative embodiments.

Referring to FIG. 5, to initiate registration of the account nominee with the computer account server 110, the account owner computer terminal 100 sends (block 502) a nominee registration message containing a social media identity of the account nominee to the computer account server 110. The social media identity may include a social media name for the account nominee (e.g., Facebook™ user name, LinedIn™ user name), a blog network account name (e.g., Tumblr™ name), a micro blog name (e.g., Twitter™ name), and/or another user identifier of a type of social media account. The social media identity may alternatively or additionally include keywords that are known to be tracked/followed by a social media application operated on the account nominee computer terminal 120 by the account nominee.

The computer account server 110 electronically posts (block 504) content of the nominee registration message through an application programming interface with the social media server 500. The social media server 500 responsively electronically posts (block 506) the content of the nominee registration message for private viewing by the account nominee computer terminal 120 or for public viewing to a group of computer terminals that includes the account nominee computer terminal 120.

The account nominee computer terminal 120, via a social media application executed by the terminal 120 using an application programming interface to the social media server 500, tracks (block 508) postings on the social media server 500 that are directed to the account nominee social media identity or containing defined keywords that are tracked by the account nominee computer terminal 120 through e.g., a social media application processed thereon. The account nominee computer terminal 120 responsively electronically posts a nominee acceptance message through the application programming interface with the social media server 500, which responsively posts (block 510) the message directed to a social media identity of the computer account server 110 or electronically posts the message for viewing by a group of computer terminals that includes the computer account server 110.

The computer account server 110 tracks (block 512) via the application programming interface social media messages posted through the social media server 500, to identify the nominee acceptance message. The computer account server 110 validates (block 514) the nominee acceptance message and, responsively stores the nominee identity information contained in the nominee registration message and/or the nominee acceptance message. The computer account server 110 determines (block 516) that an account handoff event has become satisfied, e.g., the computer account has remained inactive for at least a threshold inactivity time period. The computer account server 110 responsively contacts the account nominee computer terminal 120 indirectly through the social media server 500 by posting (block 518) through the application programming interface with the social media server 500 a nominee handoff message to the social media server 500 which is directed to the social media identifier of the account nominee or contains keywords that are known to be tracked by the account nominee through, e.g., a social media application executed by the account nominee computer terminal 120. The social media server posts (block 520) the nominee handoff message.

The account nominee computer terminal 120 identifies the nominee handoff message by tracking (block 522) postings on the social media server 500, and responsively sends (block 524) a nominee access request message to the computer account server 110 indirectly through the posting (block 526) made to the social media server 500. The computer account server 110 tracks, through the application programming interface with the social media server 500, social media messages posted by the nominee computer terminal 120, and identifies that one of the social media messages contains a nominee access request message. The computer account server 110 validates (block 528) the nominee access request message. The computer account server 110 selectively grants (block 530) the nominee computer terminal 120 access to information in the data structure of the computer account responsive to the nominee access request message being properly validated.

Some other embodiments are directed to the computer account server 110 not performing the account nominee of the nomination for the computer account until the account handoff event becomes satisfied. The account owner may thereby secretly nominate a person to serve as the account nominee, and only have that person notified if and when the account handoff event become satisfied. Because the account nominee is therefore unaware of the nomination, it becomes important to be able to track any changes to the nominee's current contact identity, which can be performed by tracking social media postings of the account nominee over time. These and other related embodiments are explained with regard to the combined flowchart's and data flow diagram of FIG. 6.

Figure 6:
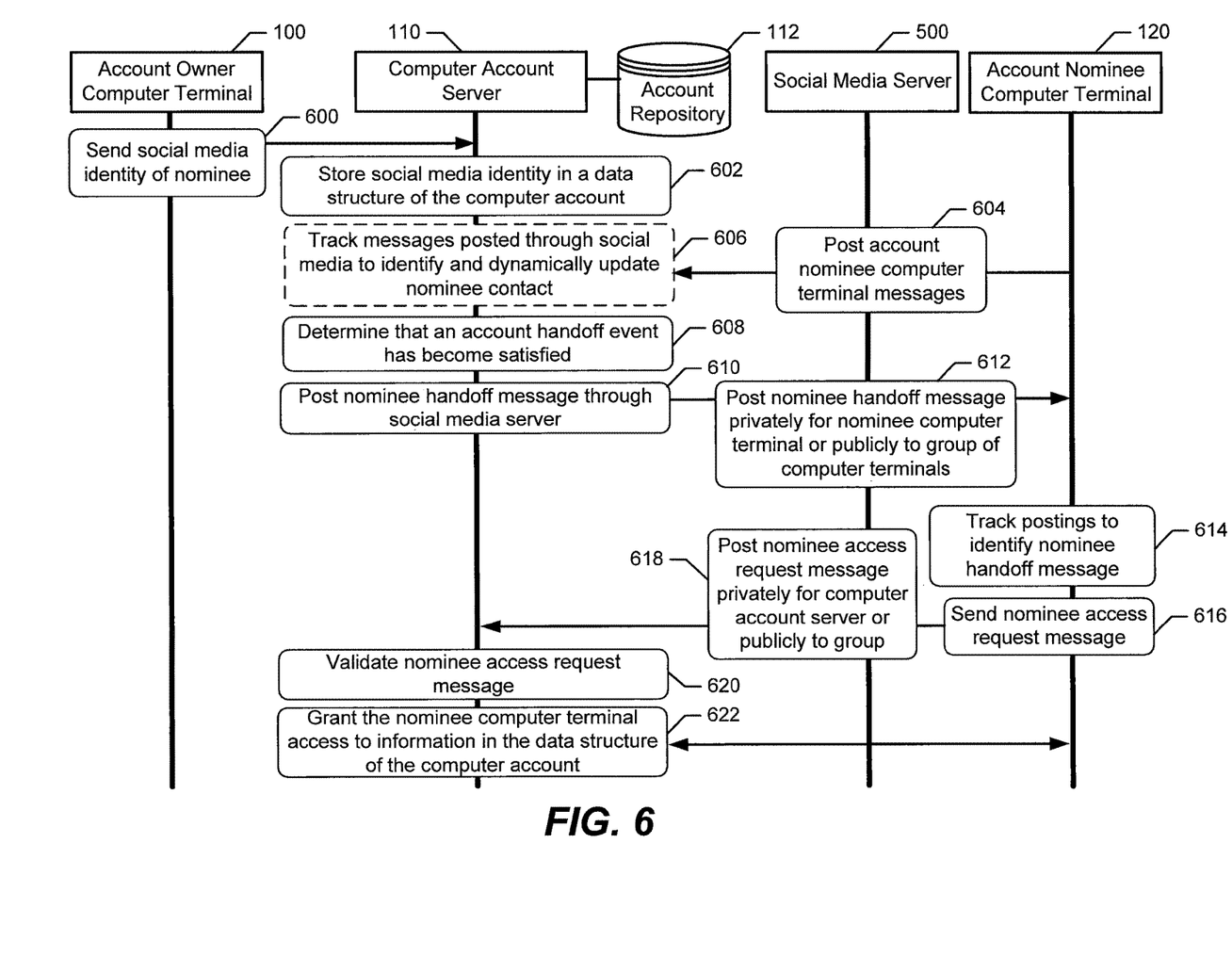
FIG. 6 is a combined flowchart and data flow diagram of operations performed by an account owner computer terminal, a computer account server, a social media server, and an account nominee computer terminal in accordance with some other alternative embodiments.

Referring to FIG. 6, the account owner computer terminal 100 sends (block 600) the social media identity of the account nominee to the computer account server 110, which stores (block 602) the social media identity in a data structure of the computer account associated with the account owner. The social media identity of the account nominee is sent to the computer account server 110. The social media identity may include a social media name (e.g., Facebook™ user name, LinedIn™ user name), a blog network account name (e.g., Tumblr™ name), a micro blog name (e.g., Twitter™ name), and/or another user identifier of a type of social media account.

The computer account server 110 electronically tracks (block 606), through an application programming interface, with the social media server 500 to identify messages posted (block 604) by the account nominee computer terminal 120. The computer account server 110 analyzes content of the posted messages to identify present contact information for the account nominee, and dynamically updates the nominee's contact information over time as it changes. For example, the computer account server 110 may identify when the nominee's cell phone number changes and responsively update a short message service (e.g., text message address) that can be used to send messages to the account nominee. By way of another example, the computer account server 110 may identify when the nominee's social media identity changes, e.g., by the account nominee obtaining a new family name through marriage, and update the social media identity of the account nominee that is stored in the data structure of the computer account. The computer account server 110 may perform keyword searching through messages posted by the account nominee to the social media account to identify defined keywords associated with name changes, change of mailing address, change of telephone number, etc.

The computer account server 110 determines (block 608) that an account handoff event has become satisfied, e.g., the computer account has remained inactive for at least a threshold inactivity time period. The computer account server 110 responsively contacts the account nominee computer terminal 120 indirectly through the social media server 500 by posting (block 610) through the application programming interface with the social media server 500 a nominee handoff message to the social media server 500 which is directed to the social media identifier of the account nominee or contains keywords that are known to be tracked by the account nominee through, e.g., a social media application executed by the account nominee computer terminal 120. The social media server posts (block 612) the nominee handoff message.

The account nominee computer terminal 120 identifies the nominee handoff message by tracking (block 614) postings on the social media server 500, and responsively sends (block 616) a nominee access request message to the computer account server 110 indirectly through the posting (block 618) made to the social media server 500. The computer account server 110 tracks, through the application programming interface with the social media server 500, social media messages posted by the nominee computer terminal 120, and identifies that one of the social media messages contains a nominee access request message. The computer account server 110 validates (block 620) the nominee access request message. The computer account server 110 selectively grants (block 622) the nominee computer terminal 120 access to information in the data structure of the computer account responsive to the nominee access request message being properly validated. Validation of the nominee access request message may be based on it containing credentials that correspond to the account nominee identity (e.g. social media identity, account nominee name, and/or account nominee password) stored in the data structure of the computer account.

Figure 7:
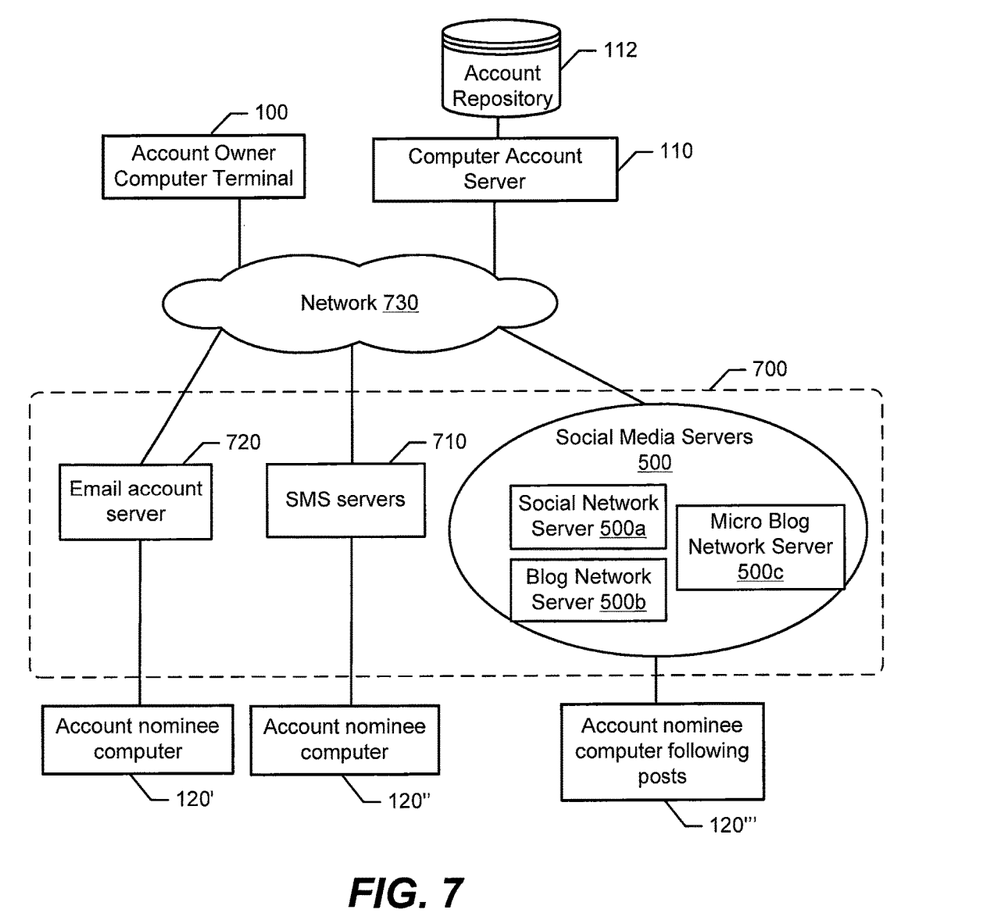
FIG. 7 is a block diagram of a system is configured according some embodiments.

FIG. 7 is a block diagram of a system is configured according some embodiments. Referring to FIG. 7, the system includes the account owner computer terminal 100, the computer account server 110 that controls access to data structures of computer accounts that reside in the account repository 112, e.g., mass data storage nonvolatile memory devices. The system further includes message servers 700, which can include email account servers 720, short message service (SMS) servers 710, and/or social media servers 500 which are communicatively connected to the account owner computer terminal 100 and the computer account server 110 through one or more networks 730, e.g., private data networks and/or public (e.g., Internet) data networks. The social media server(s) 500 may include a social network server 500a (e.g., Facebook™, LinedIn™), a blog network server 500b (e.g., Tumblr™), a server providing Web2.0 Properties/Networks, etc.), a micro blog network server 500c (e.g., Twitter™), and/or another type of social media server. One or more account nominee computers 120'-120Z''' are communicatively connected to one or more of the message server 700 to communicate with the computer account server 110.

Figure 8:
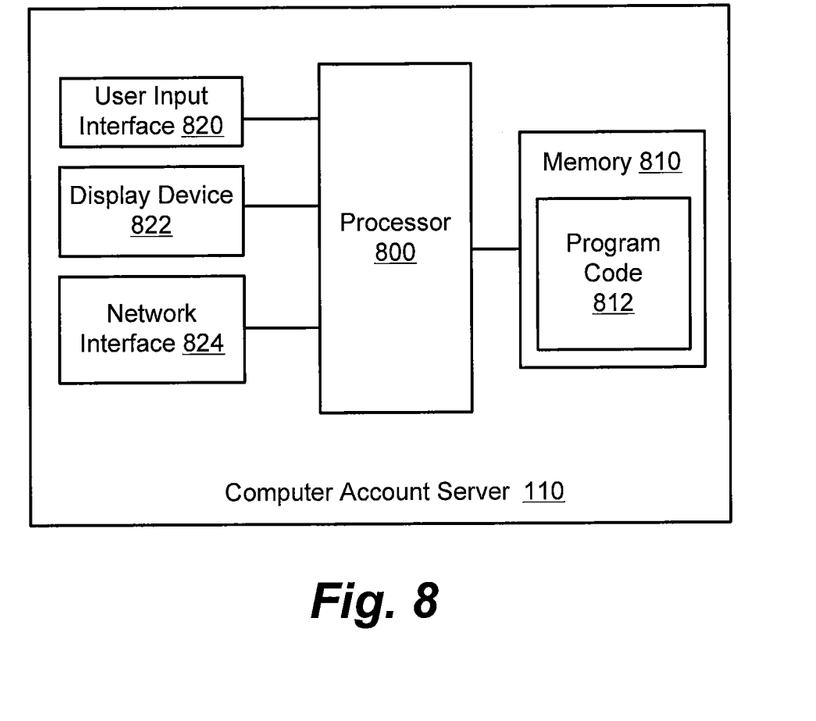
FIG. 8 is a block diagram of a computer account server configured according to some embodiments.

FIG. 8 is a block diagram of a computer account server 110 configured according to some embodiments. Referring to FIG. 8, the computer account server 110 includes a processor 800, a memory 810, and a network interface 824 which may include a radio access network transceiver and/or a wired network interface (e.g., Ethernet interface). The radio access network transceiver can include, but is not limited to, a LTE or other cellular transceiver, WLAN transceiver (IEEE 802.11), WiMax transceiver, or other radio communication transceiver configured with the data network 730.

The processor 800 may include one or more data processing circuits, such as a general purpose and/or special purpose processor (e.g., microprocessor and/or digital signal processor) that may be collocated or distributed across one or more networks. The processor 800 is configured to execute computer program code 812 in the memory 810, described below as a non-transitory computer readable medium, to perform at least some of the operations described herein as being performed by an access control computer. The computer program code 812 when executed by the processor 800 causes the processor 800 to perform operations in accordance with one or more embodiments disclosed herein for the computer account server 110. The computer account server 110 may further include a user input interface 820 (e.g., touch screen, keyboard, keypad, etc.) and a display device 822.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   performing operations as follows on a processor of a computer account server:
   receiving a nominee identity from an account owner associated with owner access credentials;
   storing the nominee identity in a data structure of a computer account that is selected based on the owner access credentials from among a plurality of computer accounts managed by the computer account server;
   restricting electronic access to information stored in the data structure of the computer account, to access requests from computer terminals that provide the owner access credentials;
   responsive to determining that an account handoff event has become satisfied for the computer account, sending a nominee handoff message using the nominee identity retrieved from the data structure of the computer account;
   receiving a nominee access request message, responsive to the nominee handoff message, from a nominee computer terminal contacted through the nominee handoff message;
   responsive to validating content of the nominee access request message, modifying the restricting of electronic access to grant the nominee computer terminal electronic access to the information stored in the data structure of the computer account;
   receiving a set of nominee identities which includes the nominee identity;
   obtaining security key fragments; and
   distributing different ones of the security key fragments to different computer terminals identified by associated ones of the nominee identities in the set, one of the computer terminals including the nominee computer terminal,
   wherein responsive to determining that the account handoff event has become satisfied for the computer account, nominee handoff messages are sent to the computer terminals;
   wherein receiving the nominee access request message, comprises receiving the security key fragments from the computer terminals identified by the nominee identities in the set responsive to the nominee handoff messages, and receiving the nominee access request message from the nominee computer terminal;
   wherein the validation of content of the nominee access request message from the nominee computer terminal, comprises generating a reconstructed security key based on the key fragments received from the computer terminals and validating the reconstructed security key.

2. The method of claim 1, wherein the nominee handoff message is addressed to a network address determined based on the nominee identity retrieved from the data structure of the computer account.

3. The method of claim 2, further comprising:
   prior to sending the nominee handoff message, sending a nominee registration message that is addressed to the network address and contains nominee access credentials determined based on the nominee identity,
   wherein the storing the nominee identity in the data structure of the computer account is performed responsive to receiving a nominee acceptance message from the nominee computer terminal, and comprises storing credential information defined based on the nominee access credentials into the data structure of the computer account, and
   wherein the validation of content of the nominee access request message is based on the nominee access request message containing credentials that correspond to the credential information stored in the data structure of the computer account.

4. The method of claim 1, wherein:
   the receiving nominee identity from the account owner associated with owner access credentials, comprises:
   receiving a validity time period during which the nominee identity remains valid; and
   the sending a nominee handoff message using the nominee identity retrieved from the data structure of the computer account is performed only if the account handoff event is determined to have become satisfied for the computer account before expiration of the validity time period.

5. A method comprising:
   performing operations as follows on a processor of a computer account server:
   receiving a nominee identity from an account owner associated with owner access credentials;
   storing the nominee identity in a data structure of a computer account that is selected based on the owner access credentials from among a plurality of computer accounts managed by the computer account server;
   restricting electronic access to information stored in the data structure of the computer account, to access requests from computer terminals that provide the owner access credentials;
   responsive to determining that an account handoff event has become satisfied for the computer account, sending a nominee handoff message using the nominee identity retrieved from the data structure of the computer account;

receiving a nominee access request message, responsive to the nominee handoff message, from a nominee computer terminal contacted through the nominee handoff message;

responsive to validating content of the nominee access request message, modifying the restricting of electronic access to grant the nominee computer terminal electronic access to the information stored in the data structure of the computer account;

responsive to receipt of the nominee identification information, electronically posting through an application programming interface with a social media server, a nominee registration message having content defined based on the nominee identity;

tracking, through the application programming interface with the social media server, social media messages posted by the nominee computer terminal to the social media server;

identifying that one of the social media messages contains a nominee acceptance message;

validating content of the nominee acceptance message based on the nominee identity; and selectively performing the storing of the nominee identity in the data structure, based on a result of the validating of the content of the nominee acceptance.

6. The method of claim 5, further comprising:

responsive to determining that the account handoff event has become satisfied for the computer account, sending the nominee handoff message by electronically posting content of the nominee handoff message through the application programming interface with the social media server, wherein the nominee access request message is received by:
  tracking, through the application programming interface with the social media server, social media messages posted by the nominee computer terminal to the social media server; and
  identifying that one of the social media messages is the nominee access request message.

7. A method comprising:

performing operations as follows on a processor of a computer account server:

receiving a nominee identity from an account owner associated with owner access credentials;

storing the nominee identity in a data structure of a computer account that is selected based on the owner access credentials from among a plurality of computer accounts managed by the computer account server;

restricting electronic access to information stored in the data structure of the computer account, to access requests from computer terminals that provide the owner access credentials;

responsive to determining that an account handoff event has become satisfied for the computer account, sending a nominee handoff message using the nominee identity retrieved from the data structure of the computer account;

receiving a nominee access request message, responsive to the nominee handoff message, from a nominee computer terminal contacted through the nominee handoff message;

responsive to validating content of the nominee access request message, modifying the restricting of electronic access to grant the nominee computer terminal electronic access to the information stored in the data structure of the computer account;

responsive to determining that the account handoff event has become satisfied for the computer account, sending the nominee handoff message by electronically posting content of the nominee handoff message through the application programming interface with a social media server; and tracking, through the application programming interface with the social media server, social media messages posted by the nominee computer terminal to the social media server, and wherein the nominee access request message is received by:
  tracking, through the application programming interface with the social media server, social media messages posted by the nominee computer terminal to the social media server; and
  identifying that one of the social media messages is the nominee access request message.

8. The method of claim 7, wherein the validation of content of the nominee access request message is based on the nominee access request message, received through the posting by the social media server, containing credentials that correspond to the nominee identity stored in the data structure of the computer account.

* * * * *